United States Patent
Bernatowicz et al.

(10) Patent No.: US 6,716,888 B2
(45) Date of Patent: Apr. 6, 2004

(54) METHODS AND APPARATUS FOR THE FORMATION OF HETEROGENEOUS ION-EXCHANGE MEMBRANES

(75) Inventors: Joseph M. Bernatowicz, Langhorne, PA (US); Michael J. Snow, Rancho Santa Fe, CA (US); Ronald J. O'Hare, South Laguna, CA (US)

(73) Assignee: Electropure, Inc., Laguna Hills, CA (US)

( * ) Notice: Subject to any disclaimer, the term of this patent is extended or adjusted under 35 U.S.C. 154(b) by 0 days.

(21) Appl. No.: 10/336,298

(22) Filed: Jan. 3, 2003

(65) Prior Publication Data

US 2003/0100618 A1 May 29, 2003

Related U.S. Application Data

(62) Division of application No. 09/444,055, filed on Nov. 19, 1999, now Pat. No. 6,503,957.

(51) Int. Cl.[7] .................................................. C08J 5/20
(52) U.S. Cl. ........................................................ 521/27
(58) Field of Search .......................................... 521/27

(56) References Cited

U.S. PATENT DOCUMENTS

| | | | |
|---|---|---|---|
| 4,167,551 A | * 9/1979 | Tamura et al. ................. 521/27 |
| 4,909,971 A | * 3/1990 | Coughlin et al. ........... 264/45.5 |
| 5,629,253 A | * 5/1997 | Chang ........................ 502/111 |
| 5,788,826 A | * 8/1998 | Nyberg ....................... 204/536 |
| 5,955,187 A | * 9/1999 | McCormack et al. .... 428/315.5 |
| 6,187,696 B1 | * 2/2001 | Lim et al. ...................... 442/77 |

* cited by examiner

*Primary Examiner*—Bernard Lipman
(74) *Attorney, Agent, or Firm*—Frank Frisenda

(57) ABSTRACT

The present invention provides methods and apparatus for the formation of heterogeneous ion-exchange membranes by prescribed in-line compounding and extrusion of a polymeric binder and heat sensitive ion-exchange resin. The ion-exchange resin is incorporated, at a late process stage, into the melted matrix polymer at relatively low temperature and residence time prior to transfer to a die head for extrusion. In the presently preferred embodiment, the in-line compounding apparatus comprises a twin-screw compounding extruder, for effecting late stage kneading and mixing of ion-exchange resin and optional additives to the polymer melt, prior to compression to transfer the blended polymer melt to a die head for extrusion. Accordingly, the final properties of the resultant heterogeneous ion-exchange membrane are enhanced as the blended polymer melt material is not exposed to excessive heat and shear history. Resultant heterogeneous ion-exchange membranes and apparatus for treatment of fluid streams utilizing such membranes are also provided.

11 Claims, 1 Drawing Sheet

METHODS AND APPARATUS FOR THE FORMATION OF HETEROGENEOUS ION-EXCHANGE MEMBRANES

CROSS-REFERENCE TO RELATED APPLICATION

This application is a divisional application of our prior U.S. application Ser. No. 09/444,055, filed Nov. 19, 1999 now U.S. Pat. No. 6,503,957 issued Jan. 7, 2003.

BACKGROUND OF THE INVENTION

The present invention provides unique heterogeneous ion-exchange membranes, methods and apparatus for producing such membranes, and ion-removing apparatus utilizing such membranes.

Purification of fluids such as water, beverages, chemicals and waste streams can be accomplished in a variety of different systems for a plurality of different end results. For ultrapure and drinking water purposes, purification may require the removal of substantial amounts of ions contained within brackish or salt water, may require the removal of turbidity and large particles, or may require the destruction of living organisms. Such purification may also require removal of substantial amounts of ions from reverse osmosis permeate and DI permeate.

For removal of ions, several basic systems have found commercial acceptance: ion-exchange, reverse osmosis, electrodialysis and electrodeionization.

In general, established methods for deionizing fluids include: distillation, ion exchange, electrodialysis, and reverse osmosis. Distillation separates water from contaminants by transferring water into vapor phase, leaving most contaminants behind. Ion-exchange removes ions from solutions by exchange of salts for hydrogen and hydroxide ions. Electrodialysis uses membranes that remove salts by ion transfer under the influence of a direct electrical current. Reverse osmosis uses membranes that are permeable to water but not to solutes, with water being purified as it is driven by pressure through the membranes. Electrodeionization (EDI) processes combine the use of ion-exchange resins and membranes to deionize water. EDI equipment is capable of efficient deionization of a wide range of feeds from bulk salt removal to polishing of reverse osmosis product water.

Typically, in electrodeionization, a number of flat sheets of alternating cation and anion exchange membranes are placed between two electrodes with mixed bed of ion-exchange resins alternately added between the membranes.

The compartments containing the resin beads are generally referred to as the dilute compartments. The adjacent compartments into which ions are transferred for disposal are referred to as the concentrate compartments. The concentrate compartments usually are much thinner than the dilute compartments, and serve to collect the concentrated ions being transferred from the dilute compartments. The concentrate compartment may or may not contain additional ion-exchange resin.

When fluid flow is fed through the system, and electrical potential (voltage) is applied, ions begin to migrate towards the electrodes; the anions to the anode and the cations to the cathode.

In the dilute compartments, ions are able to cross into the neighboring concentrate compartments only when they encounter the 'right' membrane; that is, when anions encounter anionic membranes and cations encounter cationic membranes.

In the concentrate compartment, ions continue their migration to the electrodes, but now they encounter the 'opposite' membranes; that is, anions encounter cationic membranes while cations encounter anionic membranes. These membranes block their motion, trapping them in the concentrate compartment where they are rinsed out.

The net result of the EDI process is that water is continuously deionized in the dilute compartments, with the unwanted ions exiting from the concentrate compartments.

U.S. Pat. No. 4,465,573 issued to Harry O'Hare for Method and Apparatus for Purification of Water describes such devices and the advent of electrodeionization that continues to gain commercial acceptance among various end users.

A critical element of such purification devices is the membrane that selectively allows diffusion and adsorption of ions while excluding certain other ions and non-ionized solutes and solvents. These membranes have commonly been referred to as ion-exchange membranes and are used in a wide variety of devices for fractionation, transport depletion and electroregeneration, purification for treatment of water, food, beverages, chemicals and waste streams. Such membranes are also used in electrochemical devices and electrophoresis as well as analytical equipment and for treatment applications.

Commercially available ion-exchange membranes are generally classified as two types: homogeneous membranes and heterogeneous membranes. A homogeneous membrane is one in which the entire volume of the membrane (excluding any support material that may be used to improve strength) is made from the reactive polymer. Heterogeneous membranes, on the other hand, are formed of a composite containing an ion-exchange resin to impart electrochemical properties and a binder to impart physical strength and integrity.

The ion-exchange resin particles serve as a path for ion transfer serving as an increased conductivity bridge between the membranes to promote ion movement. Under conditions of reduced liquid salinity, high voltage and low flow, the resins also convert to the H+ and OH− forms due to the splitting of water into its ions in a thin layer at the surface of the resin particles or membranes. This further improves the attainable quality of water. During electrodeionization, the ion concentration within the resin particles is maintained relatively constant and the migration of ions from the resin particles into the concentration compartments is substantially balanced by the migrations of the same, or similar ions from the water being purified into the resin particles.

Such membranes should be resistant to elevated temperatures, result in a low pressure loss, and result in low internal and external leaks. The low pressure loss reduces pumping requirements and also allows the membranes to be spaced more closely to each other, thereby reducing power consumption caused by the electrical resistance of the water streams. For selective ion electrodialysis, selective ion-exchange resins can be used as the resin component of the inventive membrane. For transport depletion electrodialysis, mixed anion and cation resins, or amphoteric resins can be used in place of the resin component of one of the anion or cation membranes. For transport of large, multivalent or slow diffusing ions, low cross-linked ion exchange resins can be used in the membrane.

Typically, the starting ion-exchange resin bead has the physical characteristic in appearance as a translucent, spherical bead with an effective size of from about 0.25 to about 0.75 mm. Chemical stability of ion-exchange resins is dependent among other factors on operating temperatures that generally should not exceed 285 degrees F. for cation exchange resin and 195 degrees F. for anion exchange resin. The resin beads are generally produced by a process incorporating cross-linked polystyrene with an active functional group such as sulfonic acid (cation) or quaternary ammonium functional groups (anion).

The foregoing membranes are useful in apparatus of reverse osmosis (RO), electrodialysis (ED) and electrodialysis reversal (EDR) processes. Such membranes are particularly useful for electrodeionization and electrodeionization reversal applications, where the reduction in leakage and pressure loss is important, along with the advantage of being able to readily bond the membranes within the device. Chemical resistance is particularly important because elements and ions such as hydrogen, hydroxide, hydronium ions, oxygen and chlorine may be produced in situ, in electrodeionization devices. Furthermore, the smoothness of the membrane simplifies automation of resin filling and removal of backwashing of the resin between membranes. Finally, the elimination of adhesives reduces the level of extractables, a significant advantage when electrodeionization apparatus is used in ultrapure water production.

A wide variety of such membranes are known to the art. In this respect, such membranes are described for instance, in U.S. Pat. Nos. 3,627,703; 4,167,551; 3,876,565; 4,294,933; 5,089,187; 5,346,924; 5,683,634; 5,746,916; 5,814,197; 5,833,896; and 5,395,570.

U.S. Pat. No. 5,346,924 to Giuffrida discloses a heterogeneous ion-exchange membrane using a binder comprising a linear low density polyethylene (LLDPE) or a high molecular weight high density polyethylene (HMWHDPE) and methods for making the same. The membrane is fabricated from granules or pellets of ion-exchange resin and either LLDPE or HMWHDPE binder that are used as a raw material in a thermoplastic extrusion process, a heat pressing process, or another, similar process employing pressure and heat to create a dry composite sheet of constant width and thickness or having other controlled, formed dimensions. Membrane sheets formed by such processes are then conditioned and activated using a water treatment.

Conventionally, heterogeneous ion-exchange membranes are fabricated by providing granulated or powdered polymer binder to a mixer and heating until the material becomes molten. Ion-exchange resins are then added in powder form and the resulting composition is then mixed to evenly distribute the ion-exchange resins throughout the melt. The molten cast mixture may then be cast or alternatively sent to an extruder.

Where the molten mixture is cast to strand form, the strand is generally cooled and then pelletized. The pellets are thereafter fed to an extruder or other polymer processing device that combines heat and pressure. Melting and film formation is generally carried out at relatively high temperatures, e.g., 300–350 degree F. range.

Kojima, et al., in U.S. Pat. No. 3,627,703 discloses a polypropylene resin composite which comprises a polypropylene resin matrix that is both microscopically foamed and molecularly oriented in three dimensions and ion-exchanging material dispersed therein. In one embodiment, the composite is produced by a process which comprises subjecting a precursor composite comprising a solid polypropylene matrix and an ion-exchange material of greater swellability to a chemical treatment comprising an acid and an alkali treatment. In one embodied form, the polypropylene resin and ion-exchange material by kneading at a temperature above the melting point of the polyproplylene resin. Subsequent to kneading at high temperature, the mixture is thereafter formed or molded and thereafter chemically treated.

While recognizing the virtues of polypropylene as a binder, Kojima, et al., in U.S. Pat. No. 3,627,703 discloses a fabrication process for ion-exchange membrane exposing the resinous material to multiple meltings and temperature cycles.

Accordingly those skilled in the art have recognized a significant need for an efficient process for the fabrication of heterogeneous ion-exchange membranes that accurately controls processing parameters to preserve the active ion sites and other desired characteristics of the incorporated resinous material while at the same time, providing an heterogeneous ion-exchange membrane with the structural integrity required for demanding environment such as electrodeionization. The present invention fulfills these needs.

SUMMARY OF THE INVENTION

The present invention provides unique methods and apparatus for the formation of heterogeneous ion-exchange membranes by prescribed in-line compounding and extrusion of a polymeric binder and heat sensitive ion-exchange resin. The ion-exchange resin is incorporated, at a late process stage, into the melted matrix polymer at relatively low temperature and residence time prior to transfer to a die head for extrusion. In the presently preferred embodiment, the in-line compounding apparatus comprises a twin screw compounding extruder, for effecting late stage kneading and mixing of ion-exchange resin and optional additives to the polymer melt, prior to compression to transfer the blended polymer melt to a die head for extrusion. Accordingly, the final properties of the resultant heterogeneous ion-exchange membrane are enhanced as the blended polymer melt material is not exposed to excessive heat and shear history. Resultant heterogeneous ion-exchange membranes and apparatus for treatment of fluid streams utilizing such membranes is also provided.

In a presently preferred embodiment, the inventive method comprises:

a) feeding a supply of polymer binder to an in-line compounding extruder, having means for melting, kneading and transferring the polymer binder to a die head for extrusion; said extruder further having means for feeding additives to the melted polymer binder at a prescribed processing stage;

b) maintaining the polymer binder within said extruder at a temperature range of between about the softening point of said polymer binder and the melting point of said polymer binder to form a melted matrix polymer;

c) kneading the melted matrix polymer to form a homogeneous matrix;

d) subsequently adding and mixing powdered ion exchange resin to the melted matrix polymer derived from step c) to form a homogenous blended matrix within said extruder during a relatively limited residence time; and e) transporting the blended, melted polymer matrix derived from step d) to a die head for extrusion to form a heterogeneous ion-exchange membrane.

Following extrusion, the unique membranes are preferably washed in a deionized water bath at a temperature of about 180 degrees F. for at least two hours until expansion is effected.

In a presently preferred embodiment, the inventive apparatus comprises a twin-screw compounding extruder, said extruder having a first feed zone, a second melting zone, a third zone for kneading melt homogeneity, means for feeding selective additives to the polymer melt down stream of said third zone, a fourth zone for effecting further kneading and mixing of additives to the preferred polymer melt, a fifth zone for mixing extrusion agents within the blended polymer melt and a sixth compression zone to transfer the blended polymer melt to a die head for extrusion.

An optional computer processing unit can continually monitor and correct the balance of the extrusion system to effect the method for the formation of heterogeneous membranes in accordance with the present invention. The control software preferably utilizes an algorithm program to analyze the prescribed inputs from key points in the extrusion system, makes numerical calculations, and effects any necessary corrections to the extruder screw RPM, temperature range, residence time and feed rate.

The preferred polymer matrix comprises about 20% to about 80% by weight of the preferred polymer melt to be extruded from the die head. The preferred polymer binder for the matrix is metallocene propylene polymer based on single-site catalysis that produces polymers with very narrow molecular weight distribution (MWD), uniform composition distributions (CD) and narrow tacticity distributions (TD). The preferred polymer has a relatively low melting point within a range of from about 125 to about 130 degrees C. The narrow molecular weight distribution of metallocene propylene polymer provides a unique rheology that allows for extrusion of thin films. Moreover, melt flow rate (MFR) can be targeted precisely in the reactor reducing processing variability downstream and eliminating the need for post-reactor controlled rheology (CR). The molecular weight capability has an MFR range of between about 0.01 to about 5,000. Typical molecular weight distribution of the preferred polymer is about 2.0. The narrow molecular weight distribution and narrow tacticity distribution coupled with the elimination of CR processing, substantially reduces low molecular weight molecules thus significantly reducing extractables.

The ion-exchange resin to be dispersed in the polymer binder, may be any ion-exchange material which is anionic, cationic, amphoteric, or another ionic type may be used. Preferably, ion-exchange resins which are stable at the melting point range of the preferred polypropylene resins are used for preparing the blended polymer matrix.

Accordingly, the heterogeneous ion-exchange membranes in accordance with the present invention are particular useful for fabrication of electrodeionization modules. The inventive methods provide an efficient and cost effective process for formation of such membranes that exhibit enhanced properties because the resinous ion-exchange material is not exposed to excessive heat and shear history.

DETAILED DESCRIPTION OF THE PREFERRED EMBODIMENTS

Figure 1:
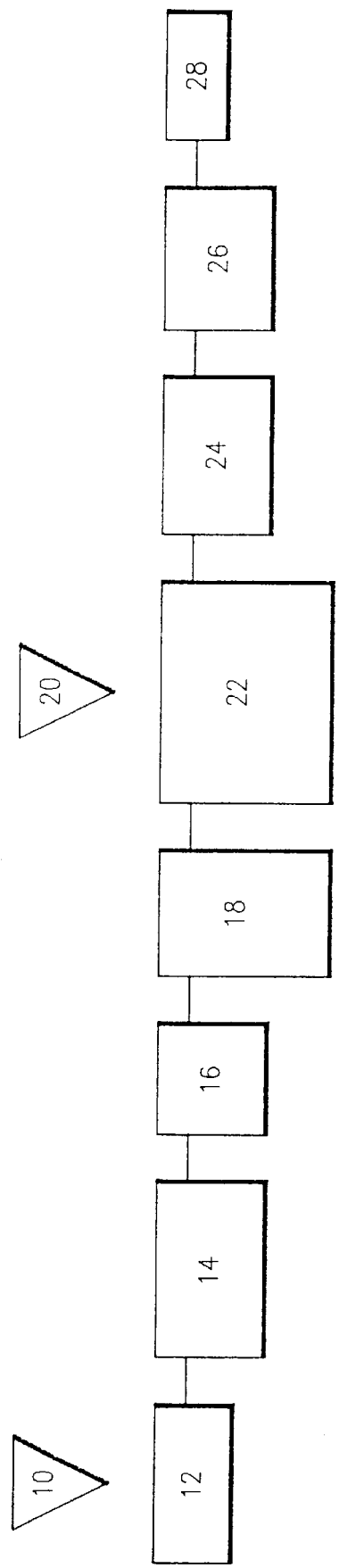
FIG. 1 is a schematic block diagram illustrating multiple zones for the embodied in-line compounding apparatus in accordance with the presently preferred embodiment of the present invention.

The present invention provides unique methods and apparatus for the formation of heterogeneous ion-exchange membranes by prescribed in-line compounding and extrusion of a polymeric binder and heat sensitive ion-exchange resin. The ion-exchange resin is incorporated, at a late process stage, into the melted matrix polymer at relatively low temperature and short residence time prior to transfer to a sheet die head for extrusion.

Accordingly, the final properties of the resultant heterogeneous ion-exchange membrane are enhanced as the blended polymer melt material is not exposed to excessive heat and shear history.

Typically, organic molecules are composed of a skeleton of carbon atoms, sheathed in hydrogens, with groupings composed of other atoms attached to that skeleton. These attached groups are referred to as functional groups, since they are always the sites of chemical reactivity or function.

In this respect, it is generally recognized the energies involved in holding two atoms together in a covalent bond are as follows:
1. Kinetic energy (motion) and heat (essentially molecular motion)
2. Potential energy arising from
   a) Electrical forces (attraction of unlike, repulsion of like charges)

At higher temperature, the energy of random molecular motion increases and can often exceed certain bond energies and thus cause covalent bond breaking.

In a presently preferred embodiment, the inventive method comprises:
a) feeding a supply of polypropylene binder to a compounding extruder, having means for melting, kneading and transferring the polymer binder to a sheet die head for extrusion; said extruder further having means for feeding and blending active additives in-line to the melted polymer binder at a prescribed point along the extruder;
b) maintaining the polymer binder within said extruder at a temperature range of between about the softening point of said polymer binder and the melting point of said polymer binder to form a melted matrix polymer;
c) kneading the melted matrix polymer to form a homogeneous matrix;
d) adding and mixing powdered ion-exchange resin, to the melted matrix polymer derived from step c) to form a homogenous blended melt within said extruder during relatively limited residence time; and
e) compressing and conveying the blended melt derived from step d) directly to a sheet die head for extrusion to form a heterogeneous ion-exchange membrane.

Following extrusion, the unique membranes are preferably washed in a deionized water bath at a temperature of about 180 degrees F. for at least two hours until expansion and full hydration are effected.

It is critical in accordance with the present invention that the ion exchange resins be added to the polymer matrix after the matrix has undergone melting and initial kneading. This late stage processing of the ion exchange resins minimizes the occurrence of covalent bond destruction of active functional groups.

The ion-exchange material to be dispersed in the composite, may be any ion-exchanging material which is anionic, cationic, amphoteric, or another ionic type may be used.

Representative particulate resins which can be utilized in accordance with this invention include gel and macroporous ion-exchange resins such as sulfonated polystyrene-divinylbenzene and aminated polystyrene-divinylbenzene either in pure form or in mixtures (Type I, Type II or Type III) such as those available under the trademark DOWEX from the Dow Chemical Company; and; chromatography resins; bifunctional ion-exchange resins such as ion retardation resins (Biord AG11A8) or ion-exchange resins containing both sulfonate and quaternary amine functionality, sulfonated phenolic resin, polystyrene phosphoric acid or iminodiacetic acid resins, aminated acrylic or methacrylic resins, epoxy polyamine resins, aminoethyl cellulose or the like.

The polymer matrix comprises from about 20% to about 80% by weight of the polymer melt to be extruded from the die head. The preferred polymer for the matrix is metallocene polypropylene polymer based on single-site catalysis that produces preferred polymers with very narrow molecular weight distribution (MWD), uniform composition distributions (CD) and narrow tacticity distributions (TD). The preferred polymer has a melting point within a range of from about 125 to about 130 degrees C. The narrow molecular weight distribution of metallocene polypropylene polymer provide a unique rheology that allows for extrusion of thin films. Moreover, melt flow rate (MFR) can be targeted precisely in the reactor reducing processing variability downstream and eliminating the need for post-reactor controlled rheology (CR). The molecular weight capability has an MFR range of between about 0.01 to about 5,000. Typical molecular weight distribution of the preferred polymer is about 2.0. The narrow molecular weight distribution and narrow tacticity distribution coupled with the elimination of CR processing, substantially reduces low molecular weight molecules thus significantly reducing extractables in the resultant membrane.

One preferred polymer for the matrix is a polypropylene polymer sold by EXXON under the brandname ACHIEVE™. The single-sitedness of the EXXPOL catalyst results in a narrow tacticity distribution (TD) and also results in a narrow composition distribution (CD) in random copolymers (RCP). The single sitedness gives rise to polymer performance advantage in the general area of cleanliness.

In the presently preferred embodiment, the in-line compounding apparatus comprises a twin-screw compounding extruder for effecting late stage kneading and mixing of ion-exchange resin and optional additives to the polymer melt, prior to compression to transfer the blended polymer melt to a sheet die head for extrusion.

The twin-screw extruder can either be co-rotating or counter-rotating. Process parameters may be manually or automatically controlled including screw rpm, feed rate, temperatures along the barrel and die, and vacuum level for devolatilization. Readouts preferably include melt pressure, melt temperature, and motor amperage. The motor inputs energy into the screws and the rotating screws impart shear and energy into the process to mix the components, devolatilize, and pump as required.

The feeder system to the twin-screw extruder should ensure attainable pressure stability in the front end of the extruder to ensure dimensional stability of the resultant membrane. Preferably gravimetric feeders are used for direct extrusion from the twin-screw extruder for improved compositional accuracy inherent with their use.

The means for mixing the additive(s) to the matrix may be dispersive or distributive. Preferably, narrower mixing elements are used in the inventive system as they are more distributive with high melt division rates with minimal elongational and planar shear. Distributive mixing elements allow many melt divisions without extensional shear.

The pressure gradient in the twin-screw extruder will be determined by the selection of screws. Flighted elements can be placed strategically so that the screw channels are not filled and there will be a zero pressure underneath downstream vent/feed barrel sections, which facilitates downstream sequential feeding and prevents vent flooding.

Preferably the powdered ion-exchange material which is sized to smaller than 100 mesh, or preferably sized to smaller than 32 mesh, is added to the melted matrix polymer through means of a side stuffer to enter a second kneading and mixing zone. The second mixing zone is provided with a side feed entry port that introduces the powdered additive to the melted matrix polymer, i.e., homogeneous polypropylene polymer. The second kneading and mixing zone is maintained at a temperature above the melting point of the polypropylene with atmospheric venting. Thereafter, the blended melted polymer matrix and ion-exchange material is fed to a third kneading and mixing zone where extrusion agents may be added. Typically, such extrusion agents comprise glycerine and the like to facilitate further processing transfer and extrusion through the die head. The third kneading and mixing zone is preferably maintained under vacuum conditions for degassing and the melted mixture is thereafter transferred through a compressional section to the die head.

The unique heterogeneous polypropylene ion-exchange membranes in accordance with the present invention were thus formed by a twin-screw compounding extruder. In this respect, the twin-screw extruder continuously mixes, devolatilizes and processes the metallocene polypropylene binder through prescribed compounding with the resinous material by relatively small shear and extentional forces. Accordingly, the traditional pelletizing step and remelting is bypassed avoiding excessive heat and shear history.

The following is an illustrative example of the inventive method and apparatus.

FIG. 1 illustrates a schematic block diagram of a presently preferred embodiment of the inventive in-line compounding apparatus in accordance with the present invention. As shown in FIG. 1, the supply of polymer binder is fed, for instance, by a gravity feed device 10 to the first zone 12 within the extrusion system. A second zone 14 effects melting of the polymer binder within the extruder at a temperature range of between about the softening point of the polymer binder and the melting point of the polymer binder to form a melted matrix polymer. In a third zone 16, the melted matrix polymer is kneaded to form a homogeneous matrix. In a fourth zone 18, optional additives may be supplied to the polymer matrix, for instance, conventional extrusion agents such as glycerine to enhance the malleability of the homogenous matrix. By separate gravity feed device 20, powdered ion-exchange resin is added to the melted matrix polymer in the fifth zone 22 and the blended matrix is further mixed and kneaded before degassing in the sixth zone 24. In a seventh zone 26, the blended, melted polymer matrix is compressed and fed to a sheet die head 28 for extrusion to form a heterogeneous ion-exchange membrane.

A heterogeneous polypropylene ion-exchange membrane was produced by feeding a supply of metallocene propylene polymer to a twin-screw compounding extruder, said extruder having a first feed zone, a second melting zone, a third zone for kneading melt homogeneity, a feed entry port disposed down stream of the third zone, a fourth zone for effecting further kneading and mixing of additives to the preferred polymer melt, a fifth zone for mixing extrusion agents within the blended polymer melt a sixth zone for degassing and a seventh compression zone to transfer the blended polymer melt to a sheet die head for extrusion. The binder was maintained within a polymer melt section of the extruder at a temperature below about 130 degrees C. to melt said binder and to knead to form a homogeneous melt. The kneaded melted matrix polymer was thereafter transported to an intermediate mixing zone and powdered ion-exchange resin was added to the melted matrix polymer with subsequent kneading and mixing the melted matrix polymer with the ion-exchange material at a temperature below about 130 degrees C. at atmospheric pressure. The blended, melted polymer matrix was then transported to a compression zone of the extruder. The blended, melted polymer matrix was thereafter transported from said compression zone to a sheet die head for extrusion to form a membrane having an extruded thickness of approximately 0.001 inches to about 0.050 inches.

Preferably, the resultant membrane has a thickness within a range of between about 0.005 and 0.025 inches. For EDI applications, the resultant member has a thickness within a range of 0.008 to 0.012 inches.

Typically, the residence time of the ion-exchange material in the extrusion system will be under two minutes and preferably less than thirty seconds.

Accordingly, the present invention provides an apparatus for the formation of a heterogeneous ion-exchange membrane comprising in a single machine: a twin-screw compounding extruder, said extruder having a first feed zone, a second melting zone, a third zone for kneading melt homogeneity, means for feeding selective additives to the polymer melt downstream of said third zone, a fourth zone for effecting the kneading and mixing of additives to the preferred polymer melt, a fifth zone for mixing extrusion agents within the blended polymer melt, which may be placed anywhere after said zone three, a sixth compression zone for degassing the blended polymer melt, and a seventh compression zone to transfer the blended polymer melt to an attached sheet die head; in addition, an adjustable sheet die head for extruding thin melted sheet membrane, a roll stack for forming, cooling and calendaring the membrane, and a membrane take-up device; wherein the residence time of the ion-exchange material is kept to a minimum while at elevated temperatures, ideally less than two minutes, and a preferably to less than one minute.

We claim:

1. A heterogeneous ion-exchange membrane comprising an ion exchange resin incorporated within a polymer binder, said membrane comprising:

a) from about 20% to about 80% by weight of polymer binder having a melting point within a range of from about 125 degrees C. to about 130 degrees C. and a melt flow rate of between about 0.01 to about 5,000; and b) an ion exchange resin dispersed within the polymer binder said ion exchange resin having a thermal stability within a range of from about 125 degrees C. to 130 degrees C.

2. The heterogeneous ion-exchange membrane as defined in claim 1, wherein said polymer binder is polypropylene.

3. The heterogeneous ion-exchange membrane as defined in claim 1, wherein said polymer binder has a molecular weight distribution of about 2.0.

4. The heterogeneous ion-exchange membrane as defined in claim 1, wherein the ion exchange resin is anionic.

5. The heterogeneous ion-exchange membrane as defined in claim 1, wherein the ion exchange resin is cationic.

6. The heterogeneous ion-exchange membrane as defined in claim 1, wherein the ion exchange resin is amphoteric.

7. The heterogeneous ion-exchange membrane as defined in claim 1, wherein said polymer binder is metallocene polypropylene.

8. The heterogeneous ion-exchange membrane as defined in claim 1, wherein the ion-exchange resin is of Type I.

9. The heterogeneous ion-exchange membrane as defined in claim 1, wherein the ion-exchange resin is of Type II.

10. The heterogeneous ion-exchange membrane as defined in claim 1, wherein the ion-exchange resin is of Type III.

11. The heterogeneous ion-exchange membrane as defined in claim 1 having a thickness within a range of from about 0.001 inches to about 0.05 inches.

* * * * *